United States Patent [19]

Takashi et al.

[11] Patent Number: 5,125,294
[45] Date of Patent: Jun. 30, 1992

[54] METHOD OF CONTROLLING SPEED RANGE SHIFTING IN AN AUTOMATIC TRANSMISSION

[75] Inventors: Aoki Takashi; Sekine Noboru; Ozawa Shigeo, all of Saitama; Shimada Takamichi, Tokyo, all of Japan

[73] Assignee: Honda Giken Kogyo Kabushiki Kaisha, Tokyo, Japan

[21] Appl. No.: 673,846

[22] Filed: Mar. 20, 1991

Related U.S. Application Data

[63] Continuation of Ser. No. 343,023, Apr. 25, 1989, abandoned.

[30] Foreign Application Priority Data

Apr. 26, 1988 [JP] Japan ................ 63-103500

[51] Int. Cl.⁵ ............................................. F16H 59/44
[52] U.S. Cl. ................................... 74/866; 364/424.1
[58] Field of Search .................. 74/866; 364/424.1

[56] References Cited

U.S. PATENT DOCUMENTS

| | | | |
|---|---|---|---|
| 4,706,522 | 11/1987 | Nitz | 74/877 X |
| 4,723,643 | 2/1988 | Numazawa et al. | 192/0.08 |
| 4,787,258 | 11/1988 | Yamamoto et al. | 74/866 |
| 4,796,490 | 1/1989 | Butts et al. | 74/877 X |
| 4,889,015 | 12/1989 | Kondo | 304/424.1 X |
| 4,955,257 | 9/1990 | Terayama et al. | 364/424.1 X |
| 5,020,391 | 6/1991 | Aoki et al. | 74/866 |
| 5,069,085 | 12/1991 | Iizuka | 364/424.1 X |
| 5,075,858 | 12/1991 | Narita | 364/424.1 |

FOREIGN PATENT DOCUMENTS

61-109941 5/1986 Japan.
61-109942 5/1986 Japan.
61-109943 5/1986 Japan.
61-189354 8/1986 Japan.

OTHER PUBLICATIONS

Patent Abstracts of JP A-61-109944, A-62-233551 and A-60-30852.
English Summary of Japanese Publication Nos. 61-189354, 61-109941 61-109942 and 61-109943.

Primary Examiner—Richard Lorence
Assistant Examiner—Khoi Q. Ta
Attorney, Agent, or Firm—Lyon & Lyon

[57] ABSTRACT

In a method of controlling speed range shifting, an input-output speed ratio (=output speed/input speed) in a shifting means by which a power transmitting route for the pre-shift speed range is selected is detected when a shift signal to shift from a speed range in which engine brake is available to another speed range in which engine brake is also available is transmitted. An intermediate power transmitting route in which engine brake is not available is selected after the transmission of a shift signal as long as the range of the speed ratio is within a specified range. Then, a power transmitting route for the post-shift speed range is selected based on the shift signal when the change in the speed ratio becomes bigger than the specified range.

8 Claims, 5 Drawing Sheets

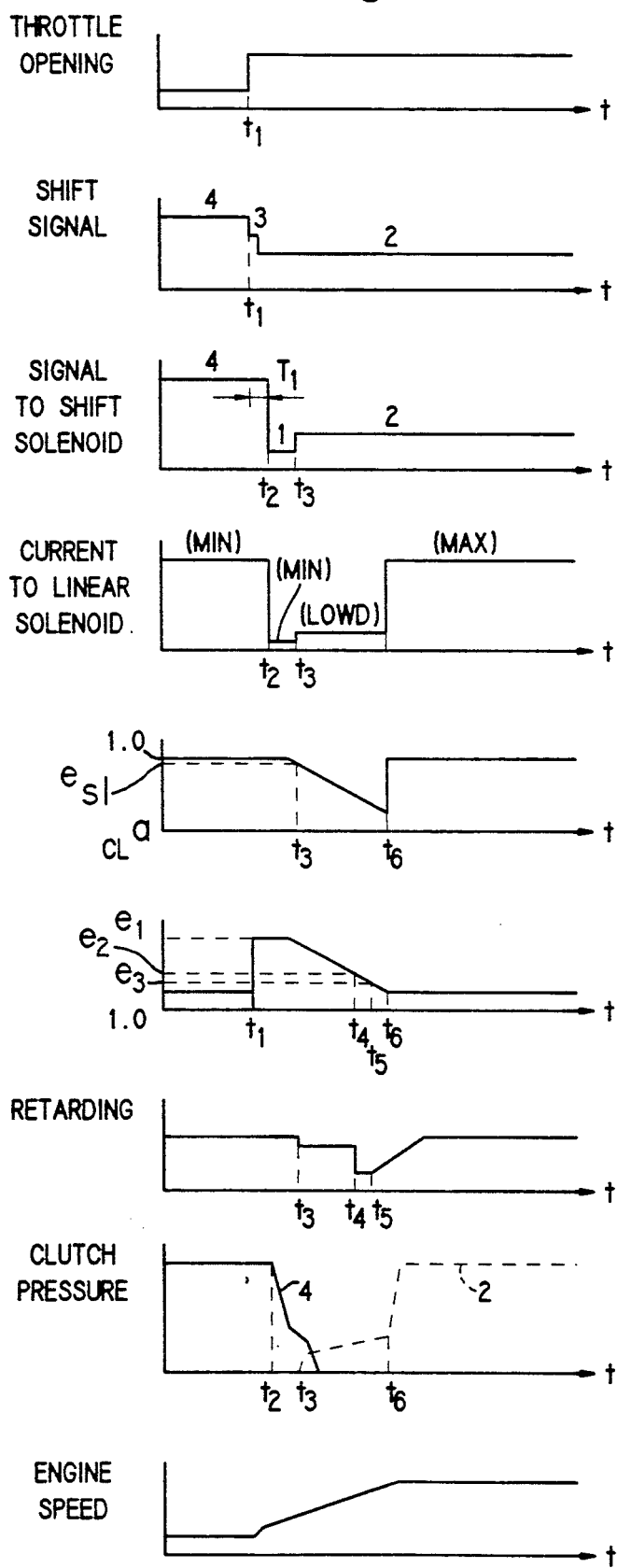

METHOD OF CONTROLLING SPEED RANGE SHIFTING IN AN AUTOMATIC TRANSMISSION

This is a continuation of co-pending application(s) Ser. No. 343,023 filed on Apr. 25, 1989 now abandoned.

BACKGROUND OF THE INVENTION

The invention relates to automatic transmission in motor vehicles for carrying out automatic shifting by switching power transmission routes, which may be in turn controlled by the operation of shifting means.

In motor vehicles, automatic transmissions are so constituted as to obtain desired driving characteristics by automatically changing their speed ratios in accordance with the driving conditions. In order to attain this purpose, it is customary to provide a shift map composed of upshifting and downshifting lines for each speed range, the lines being established in relation to the vehicle speed and the engine power output, and to control the automatic transmission to shift the speed ranges according to the shifting map dependent on the changes of traveling states as indicated on the shift map. One example of such shifting control is disclosed in Japanese Laid-Open Patent Publication No. 61-189354.

A typical automatic transmission comprises a plurality of power transmitting means (for example, a plurality of gear trains) by which a plurality of power transmitting routes are constituted, a plurality of shifting means (for example, a plurality of hydraulic clutches) by which one power transmitting route defined by one of the power transmitting means is selected, and a controlling means (for example, a hydraulic control valve) by which operations of the shifting means are controlled. In this transmission, when a point representing a traveling state in a shift map crosses a shiftup line or a shiftdwon line, a shift signal for shifting up or down is sent to the control means whose operation is often controlled by solenoid valves mounted thereon. The hydraulic control valve actuated by the solenoid valves in accordance with the shift signal operates one of the hydraulic clutches to select one power transmitting route determined by selecting one of the gear trains, thereby effectuating shifting up or down.

In such shifting, since the speed reduction ratio (gear ratio) in a pre-shift speed range (a speed range determined by the gear train selected until the shift signal was sent) differs from that in a post-shift speed range (a speed range determined by the newly selected gear train based on the shift signal), it is very important to control shifting so as not to cause jerky or delayed shifting.

For example, if the post-shift range clutch (the shifting means for the post-shift speed range) is engaged too early after the pre-shift range clutch was released during shifting down, the driving power from the running vehicle body is transmitted to the engine, thereby creating engine braking phenomenon. This engine braking power decelerates the vehicle speed to create a jerky shifting. Also, if the post-shift range clutch is engaged too early, both the post-shift and the pre-shift range clutches may engage simultaneously causing jerky shifting, wears of friction members in the clutches being increased and the durability of the clutches (shifting means) being decreased.

Accordingly, shift control methods which can avoid simultaneous engagement of the clutches and moderate shift shocks during shifting to increase the durability of the clutches are disclosed in Japanese Laid-Open Patent Publications 61-109941, 61-109942 and 61-109943. In these methods, the pre-shift speed range is shifted to the post-shift speed range through an intermediate speed range in which no engine braking force can be obtained. In other words, the power is not transmitted from the wheel to the engine in the intermediate speed range. Moreover, in case of kick-down shifting in these methods, since the engine speed can be increased rapidly at the intermediate speed range, the time from the start of shifting until the rotational synchronization of input and output members of the post-shift range clutch is shortened, and therefore the overall shifting time can be shortened.

As stated above, the shift via the intermediate speed range without engine brake can reduce chances of simultaneous engagement of both the clutches and moderate shifting shocks. However, if the time set for the intermediate speed range is too short, it is not effective. On the other hand, if the time is too long, the overall shifting time may be enlarged to give embarrassed shifting feeling to the driver or to create engine racing in case of kick-down shifting because the accelerator pedal is depressed. Therefore it is necessary to properly set the time for the intermediate speed range. However, even if this time is set by a timer to a specified value, it is still difficult to obtain a suitable shift control since the time from the transmission of the shift signal until the release of the pre-shift range clutch may well vary from one clutch to another or may vary when the oil temperature changes.

SUMMARY OF THE INVENTION

An object of the present invention is to provide a shift control method which can determine a proper setting time for an intermediate speed range having no engine brake through which the pre-shift speed range is shifted to the post-shift speed range without being affected by individual variations of the clutches or by changes in oil temperature.

In the control method according to the present invention, an input-output speed ration (= output speed/input speed) in a shifting means by which a power transmitting route for the pre-shift speed range is selected is detected when a shift signal to shift from a speed range in which engine brake is available to another speed range in which engine brake is also available is transmitted. An intermediate power transmitting route in which engine brake is not avialable is selected after the transmission of a shift signal as long as the change of the speed ratio is within a specified range. Then, a power transmitting route for the post-shift speed range is selected based on the shift signal when the change in the speed ratio becomes bigger than the specified range.

In the above control method, the pre-shift speed range is shifted to the post-shift speed range through the intermediate speed range in which no engine brake is available. The engagement of the post-shift clutch is delayed by the time spent for the intermediate speed range. Accordingly, chances of simultaneous engagement of both the pre-shift and post-shift clutches are lowered. In addition, the intermediate speed range is set immediately after the transmission of the shift signal and is released when the change in the speed ratio exceeds the specified range. Since the change of the speed ratio exceeding the specified range indicates slip of the pre-shift clutch or disengagement thereof, the intermediate speed range is appropriately released in correspondence with the disengagement of the pre-shift clutch. Release timing of the intermediate speed range and engagement timing of the post-shift clutch are suitably controlled without being affected by individual variations of the clutches or by changes in oil temperature.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, wherein:

FIG. 5 comprises graphs showing changes of data that appear in the control following the above flowchart.

DESCRIPTION OF THE PREFERRED EMBODIMENTS

Figure 1:
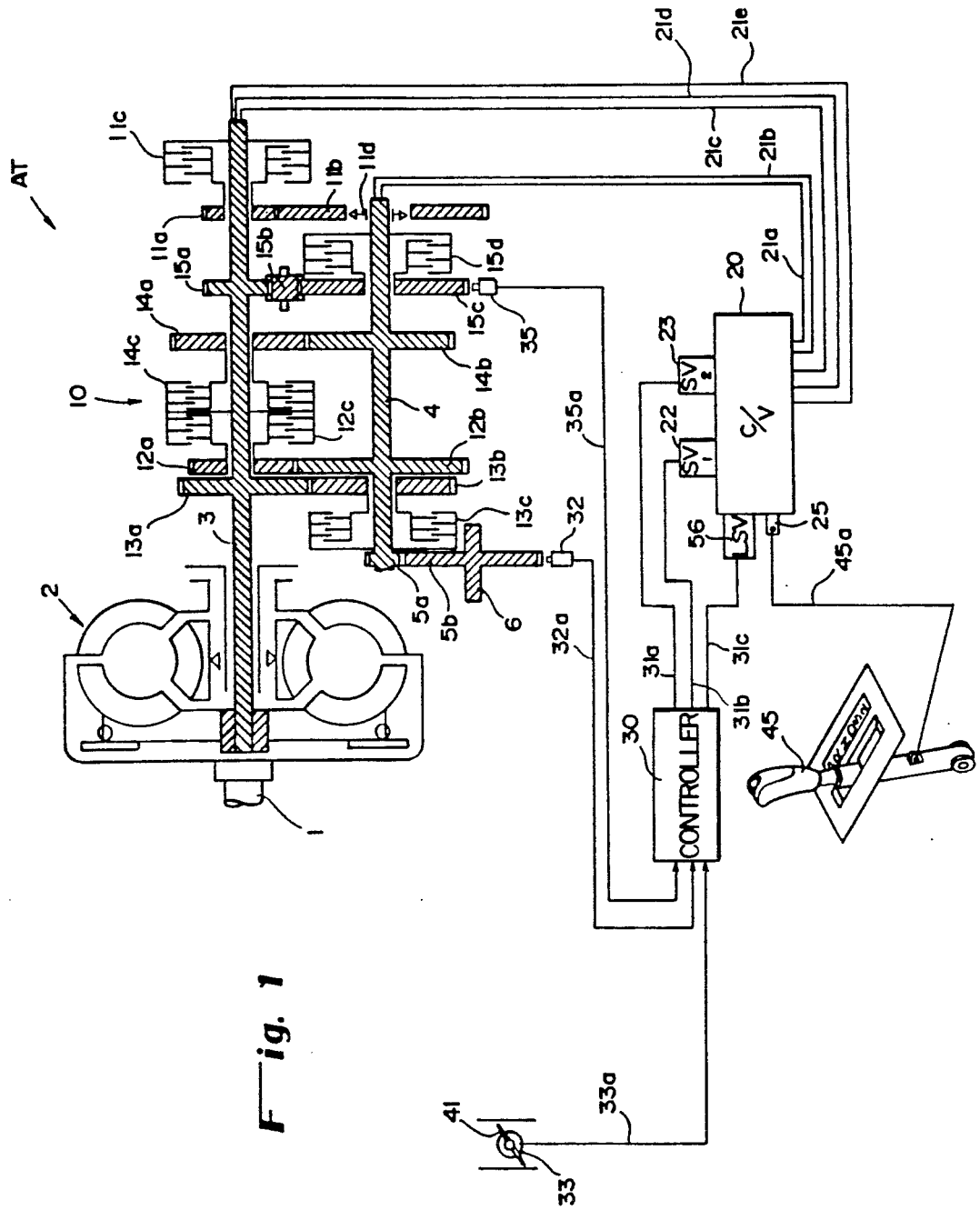
FIG. 1 is a schematic view of an automatic transmission in which speed range shifting is controlled based on the method according to the invention.

FIG. 1 is an outline illustrating the construction of an automatic transmission in which the shift control method according to the present invention is used. In this transmission AT, the engine power output is transmitted from the engine shaft 1 to the output shaft 6 through a torque converter 2 and the speed reduction mechanism 10 having a multiplicity of gear trains by which the speed is changed. Specifically, the output power of the torque converter 2 is transmitted to the input shaft 3. Then, it is transmitted to the counter shaft 4 arranged in parallel with the input shaft 3 after it is changed in speed by means of one of five gear trains disposed between the input shaft 3 and the counter shaft 4. The output power is further transmitted to the output shaft 6 through output gear trains 5a and 5b disposed between the counter shaft 4 and the output shaft 6.

The above five gear trains disposed between the input shaft 3 and the counter shaft 4 include a first speed gear train 11a and 11b, a second speed gear train 12a and 12b, a third speed gear train 13a and 13b, a fourth speed gear train 14a and 14b, and a reverse speed gear train 15a, 15b and 15c. The gear trains are each provided with hydraulically operable clutches 11c, 12c, 13c, 14c and 15d, respectively, for transmitting the power through them.

The first speed gear 11b is provided with a one-way clutch 11d. Though power can be transmitted from the engine (from the transmission input shaft 3) to the wheel (to the transmission output shaft 6), power cannot be transmitted in the opposite direction. Therefore, when the vehicle is decelerated, for example, with the accelerator pedal released, no engine brake is available.

Desirable power transmitting route determined by one of these five gear trains can be selected by selectively putting one of the five hydraulic clutches in operation, effectuating shift control. Through the power transmitting route determined by the first speed gear train 11a, 11b by putting the 1st hydraulic clutch 11c in operation, no engine brake force can be transmitted, but through the other routes determined by the other gear trains by putting the other hydraulic clutches 12c, 13c, 14c, and 15c in operation, engine brake force can be transmitted.

The five hydraulic clutches 11c through 15d mentioned above are selectively operated by the pressurized hydraulic fluid supplied from a hydraulic control valve 20 through hydraulic lines 21a, through 21e.

The operation of the hydraulic control valve 20 is controlled in accordance with the operations of a manual valve 25 which is connected to a shift lever 45 by means of a wire 45a, of two solenoid valves 22, 23, and of a linear solenoid valve 56.

The solenoid valves 22, 23 are turned on and off in correspondence with operation signals sent from a controller 30 via the signal lines 31a and 31b. The linear solenoid valve 56 is operated by signals sent from the controller 30 via the signal line 31c. The controller 30 is provided with a signal indicative of the rotational speed of the input speed of the hydraulic clutch detected by a first speed sensor 35 based on the rotation of the reverse gear 15c through the line 35a, a signal indicative of the output speed of the hydraulic clutch detected by a second sensor 32 based on the rotation of the output gear 5b via a signal line 32a, and a throttle opening signal indicative of the throttle opening of an engine throttle 41 detected by a throttle opening sensor 33 via a signal line 33a.

The input-output speed ratio "$e_{CLO}$" in the off-going clutch is calculated in the controller 30 based on a signal from the first speed sensor 35 and a signal from the second speed sensor 32 (see FIG. 1). Since the first speed sensor 35 detects rotational speed of the reverse idler gear 15c which rotates with the input shaft, the speed of the input member in each clutch can be calculated based on the signal from the first speed sensor 35. Also, since the second speed sensor 32 detects the rotational speed of the output driven gear 5b, the speed of the output member in each clutch can be calculated based on the signal from the second speed sensor 32. Accordingly, the input-output speed ratio "$e_{CLO}$" in any clutch can be calculated based on the signals from sensors 35 and 32.

The shift control in the transmission constituted as above is now described.

The shift control may be carried out in response to a shift lever 45 and according to the shift range set up by a manual valve 25 in the hydraulic control valve 20. Possible shift ranges are, for example, P, R, N, D, S, and 2. In P and N range, the hydraulic pressure clutch 11c through 15d are in non-engaged neutral state. In R range, the reverse hydraulic clutch 15d is engaged to establish a reverse range. In D, S, and 2 range, the shift control according to the shift map is carried out.

Figure 2:
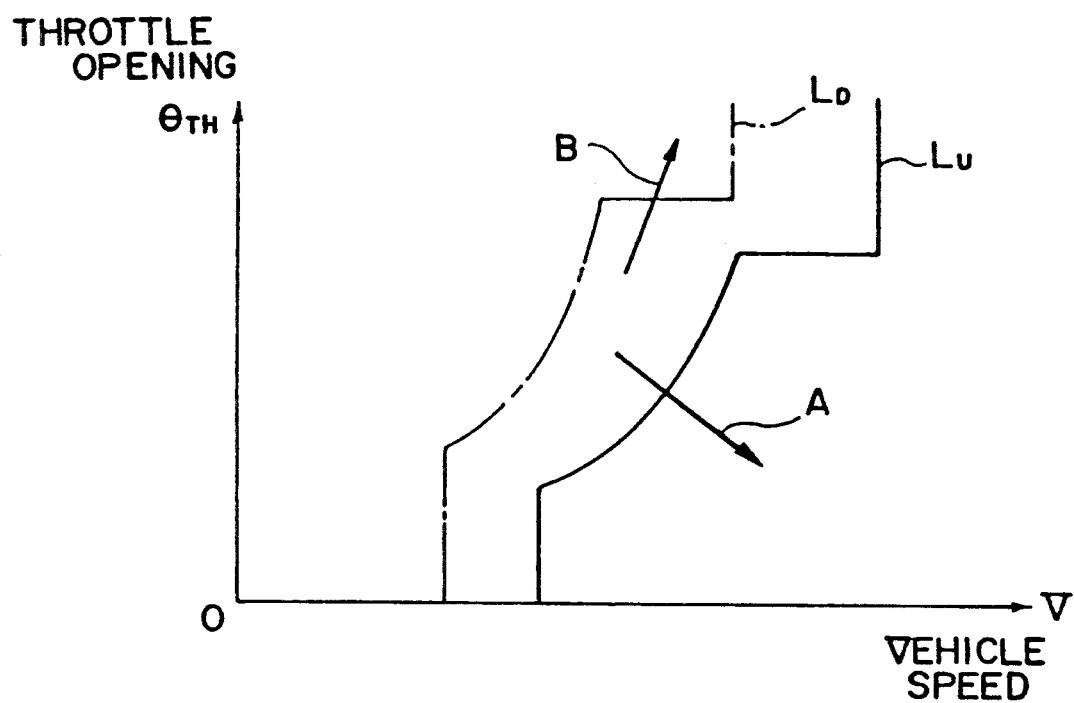
FIG. 2 is a graph of a shift map used for the above control method.

The shift map has a shift-up line $L_U$ and a shift-down line $L_D$ as shown in FIG. 2 for which the throttle opening $\theta_{TH}$ and the vehicle speed V are taken on the axis of ordinates and abscissas, respectively. A shift-up is conducted when the point representing traveling state determined by the engine throttle opening (amount of depression of the accelerator pedal) and the vehicle speed crosses the shift-up line $L_U$ to the right as shown by the arrow "A", for example, when the accelerator pedal is released during running. A shift-down is conducted when the point crosses the shift-down line $L_D$ to the left as shown by the arrow "B", for example, in case of kick-down shifting. It should be understood that although only one shift-up line and one shift-down line are shown in FIG. 2, there are in actuality multiplicity of lines corresponding to the number of speed ranges.

When the point crosses the shift-up line or shift-down line on the shift map shown in FIG. 2, a shift signal is transmitted from the controller 30 to the solenoid valves 22, 23 via signal lines 31a, 31b, which makes the hydraulic control valve 20 operate so that supplying or discharging the hydraulic pressure to or from each of the hydraulic clutches 11c through 15d, yielding a shift-up or shift-down.

Figure 3:
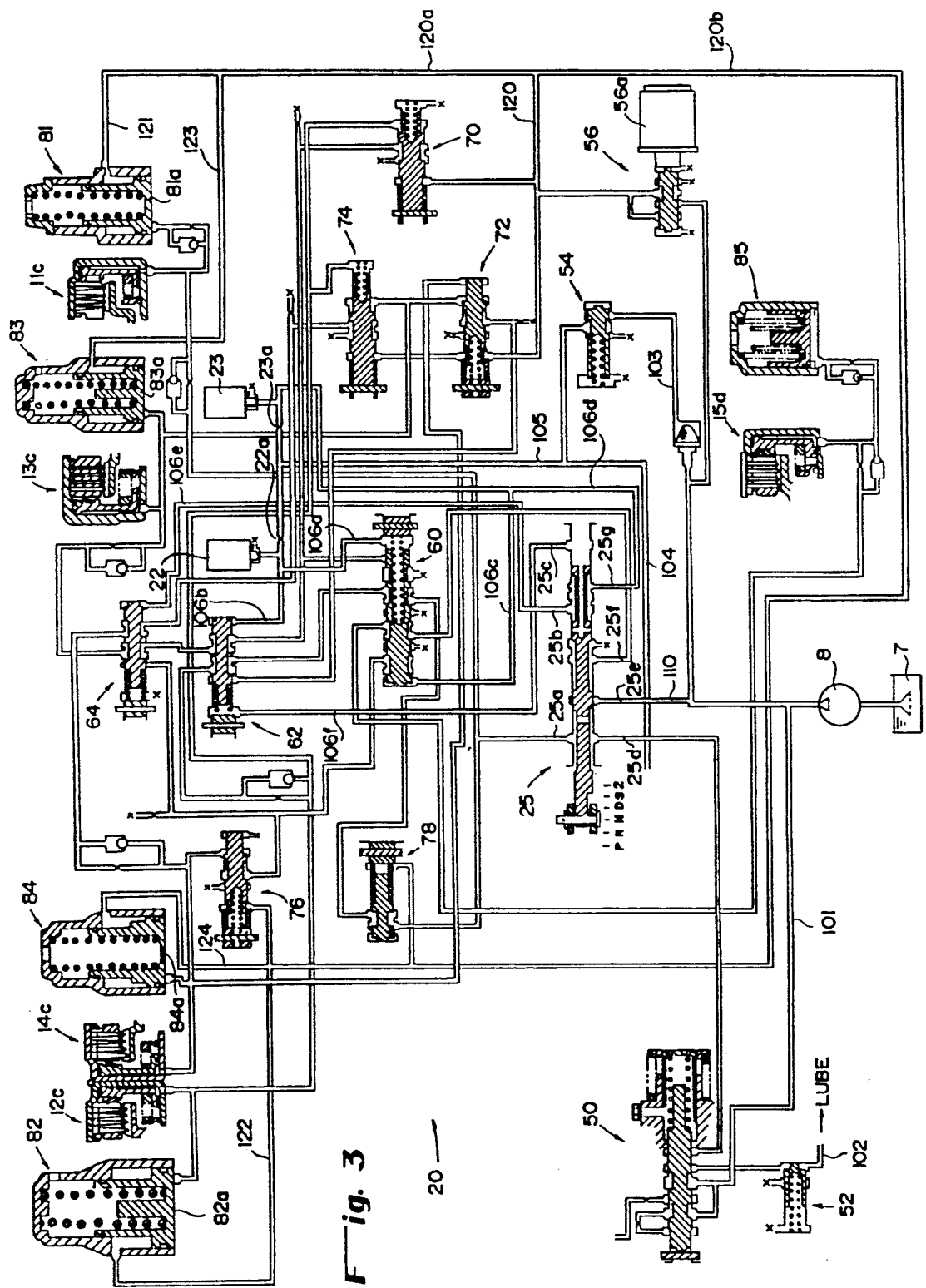
FIG. 3 is a hydraulic circuit of a control valve used in the shift control method according to the invention.

The hydraulic control valve 20 will be described below with reference to FIG. 3.

In the control valve 20, the operational fluid supplied by the pump 8 from an oil sump 7 is led through a line 101 into a regulator valve 50 which functions to maintain the fluid at a predetermined line pressure. The fluid having the line pressure is led to the manual valve 25 through the line 110. Then the fluid is supplied, via various valves in the control valve 20, to a selected one of hydraulic clutches 11c, 12c, 13c, 14c, and 15d in accordance with changes in traveling states, thereby controlling the operation of the clutch.

These various valves in the control valve 20 will be described below. A relief valve 52 is disposed in the downstream of the regulator valve 50 and prevents the pressure of the fluid for lubrication supplied to the transmission through a line 102 from exceeding a predetermined pressure. A modulator valve 54 reduces the line pressure of the fluid supplied through a line 103 to a predetermined modulator pressure, and supplies this operating fluid having the modulator pressure to a lock-up clutch control circuit (not shown), via a line 104, to control the lock-up clutch in the torque converter 2. The fluid having modulator pressure is also supplied to the first and second solenoid valves 22, 23 through a line 105 for shift control.

A manual valve 25 is operable in response to the shift lever manipulated by the driver, and may take either one of 6 positions, P, R, N, D, S, and 2. The fluid having the line pressure from the line 110 is selectively supplied to the lines 25a–25g in correspondence with the above positions.

A 1-2 shift valve 60, a 2-3 shift valve 62, and a 3-4 shift valve 64 are operated when the manual valve 25 is in either one of D, S, or 2 position by the action of the modulator pressure supplied through lines 106a–106f in accordance with the ON-OFF actuation of the first and the second solenoid valves 22 and 23. These valves are provided for controlling the supply of the line pressure fluid to the first through the fourth clutches 11c, 12c, 13c, and 14c.

The lines 106a, 106b are connected to the first solenoid valve 22 and also to the line 105 through an orifice 22a. When the solenoid of the first solenoid valve 22 is de-energized, its port leading to a drain is closed, and working fluid under the modulator pressure is supplied from the line 105 to the lines 106a, 106b. When the solenoid of the first solenoid valve 22 is energized, the drain port thereof is opened to reduce the pressure in the lines 106a, 106b substantially to zero. The lines 106c through 106f are connected to the second solenoid valve 23 and also to the line 105 via an orifice 23a. When the solenoid of the second solenoid valve 23 is turned off, the drain port thereof is closed to allow the working fluid under the modulator pressure to be supplied from the line 105 to the lines 106c through 106f. When the solenoid of the second solenoid valve 23 is turned on, the drain port thereof is opened to reduce the pressure in the lines 106c through 106f substantially to zero.

The line 106a is connected to the right-hand end (as shown of the 1-2 shift valve 60, the line 106b is connected to the right-hand end of the 2-3 shift valve 62, the line 106c is connected to the left-hand end of the 1-2 shift valve 60, the line 106e is connected to the right-hand end of the 3-4 shift valve 64, and the line 106f is connected to the left-hand end of the 2-3 shift valve 62. The lines 106e, 106f are coupled to the second solenoid valve 23 through the manual valve 25 and the line 106d. Therefore, by controlling the operation of the first and second solenoid valves 22, 23 to control the supply of the modulator pressure from the line 105 to the lines 106a through 106f, the operation of the 1-2, 2-3, and 3-4 shift valves 60, 62, 64 can be controlled to selectively supply the line pressure fed from the line 110 via the manual valve 25 to the hydraulically operated clutches 11c, 12c, 13c, 14c for selecting a desired speed range.

The control valve assembly 20 also has first second, third, and fourth orifice control valves 70, 72, 74, 76 for releasing hydraulic pressure from the hydraulic pressure chamber in the pre-shift range clutch in timed relation to the development of a pressure build-up in the hydraulic pressure chamber in the post-shift range clutch, when a shift is effected. More specifically, the first orifice control valve 70 controls the timing of releasing the hydraulic pressure from the third range clutch when a downshift is effected from the third speed range to the second speed range. The second orifice control valve 72 controls the timing of releasing the hydraulic pressure from the second range clutch when an upshift is carried out from the second speed range to the third speed range or from the second speed range to the fourth speed range. The third orifice control valve 74 controls the timing of releasing the hydraulic pressure from the fourth range clutch upon a downshift from the fourth speed range to the third speed range or from the fourth speed range to the second speed range. The fourth orifice control valve 76 controls the timing of releasing the hydraulic pressure from the third range clutch at the time of an upshift from the third speed range to the fourth speed range.

The control valve assembly 20 further includes accumulators 81, 82, 83, 84 having pressure bearing chambers communicating respectively with the hydraulic pressure chambers of the hydraulically operated clutches 11c, 12c, 13c, 14c. The accumulators 81, 82, 83, 84 also have back pressure chambers opposite to the respective pressure bearing chambers with pistons 81a, 82a, 83a, 84a therebetween, the back pressure chamber being connected to respective lines 121, 122, 123, 124 which are coupled to the linear solenoid valve 56 via lines 120b, 120a and a line 120.

The linear solenoid valve 56 has a linear solenoid 56a. A current supplied to the linear solenoid 56a is controlled to control the operating force of the linear solenoid valve 56 for controlling the magnitude of a hydraulic pressure to be supplied to a line 120. By controlling the current supplied to the linear solenoid 56a, therefore, the hydraulic pressure in the back pressure chambers of the accumulators 81 through 84 can be controlled to control the hydraulic pressure in the hydraulic pressure chamber in an engaged clutch (post-shift range clutch) when a shift is effected.

In the hydraulic pressure control valve assembly 20 thus constructed, the manual valve 25 is operated by the shift lever 45 and the solenoid valves 22, 23 are turned on and off to selectively supply the line pressure to the hydraulically operated clutches 11c, 12c, 13c, 14c for automatically selecting a speed range (gear position).

Figure 4:
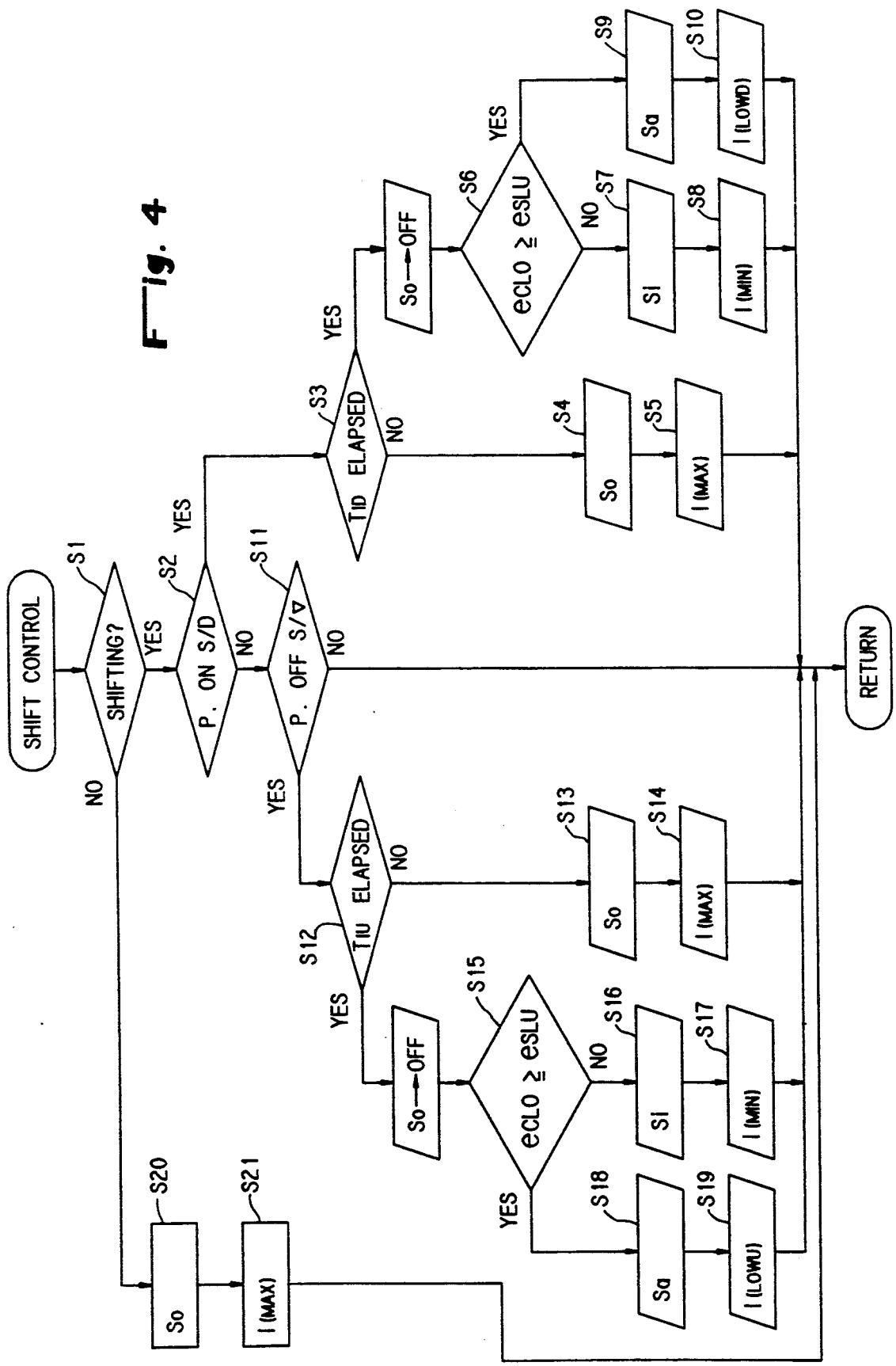
FIG. 4 is a flowchart of the shift control according to the invention.

Referring to the flowchart in FIG. 4, control of the shifting for the automatic transmission above is now described.

In this control, it is determined at first whether a shift is being conducted or not based on a traveling state indicated on the shift map in step S1. When any shift is not being conducted, the present speed range So is maintained unchanged and the electric current to the linear solenoid 56a is maintained at maximum value in steps S20, S21. The hydraulic pressure supplied from the valve 56 to the line 120 becomes maximum, and accordingly the clutch pressure for the present speed range is maintained maximum.

When it is determined in step S1 that a shift is being conducted, a determination is made in step S2 whether the shift is a power-on shift-down. The power-on shift-down means a down-shift with the accelerator pedal depressed and corresponds to "kick-down". If the traveling state change is found to be in a power-on shift-down, it is determined whether or not a delay time $T_{1D}$ has elapsed in step S3 in order to prevent frequent shifts in a short time. Until the predetermined period of delay time $T_{1D}$ elapses, the present speed range is maintained unchanged and the electric current to the linear solenoid 56a is maintained at maximum I (max) in steps S4, S5.

When the time $T_{1D}$ has elapsed, it is determined whether or not the input-output speed ratio $e_{CLO}$ (=output speed/input speed) in the present range clutch (the pre-shift range clutch) is smaller than a specified speed ratio $e_{SLD}$. The speed ratio $e_{CLO}$ in the present range clutch is 1.0 until the shift starts since this clutch is engaged, and it is gradually decreased after the shift started as the clutch is disengaged. The specified speed ratio $e_{SLD}$ is set to a value smaller than 1.0. By determining whether the ratio $e_{CLO}$ is equal to or less than the ratio $e_{SLD}$ ($e_{CLO} <= e_{SLD}$) or not, slips in the present range clutch, after the shift starts, can be detected.

If $e_{CLO} > e_{SLD}$, in other words, if the present range clutch is not disengaged and the slip in this clutch is zero or quite little, a shift signal $S_1$ to select the first speed range in which no engine brake is available because of the one-way clutch is produced and the electric current to the linear solenoid 56a is minimized (Steps S7, S8); thus the selection of the intermediate power transmitting route is determined based on a decision whether the input-output speed ratio "$e_{CLO}$" in the shifting means of the pre-shift power transmitting route (i.e., the off-going clutch) is within a specified range. When the clutch is disengaged and the speed ratio $e_{CLO}$ has become equal to or less than the specified ratio $e_{SLD}$ ($e_{CLO} <= e_{SLD}$), a shift signal Sa to select a post-shift speed range (a target speed range) based on the shift map is produced and the current to the linear solenoid 56a is set to a predetermined value I(LOWD) (steps S9, S10).

The magnitude of the current I(LOWD) is set so that the operational hydraulic pressure in the target speed range clutch is a little lower than the engagement starting pressure of the clutch but is high enough to move the piston in the clutch over an invalid stroke distance. The invalid stroke distance is merely the distance corresponding to a stroke or play of the piston (i.e., an invalid stroke). After the clutch moves over the invalid stroke the piston actually pushes the clutch to move it into engagement.

In this case, since the accelerator pedal is depressed, the engine speed is rapidly increased, decreasing the input-output speed ratio $e_{CLa}$ in the target speed range clutch. The speed ratio $e_{CLa}$ is repeatedly calculated by the shift control shown in the flow chart of FIG. 4 at predetermined intervals. When the speed ratio $e_{CLa}$ becomes substantially 1.0, it is determined that the shift has been completed. Whereby, as a result of the response "No" to the question "Shifting?" at the decision step S1 the method proceeds to steps S20 and S21, as shown in FIG. 4. Then the control flow proceeds to the steps S20 and S21, where the target speed range signal Sa is changed to a present speed range signal So and the electric current to the linear solenoid 56a is maximized. Since the piston in this clutch is moved over the invalid stroke and is in a condition immediately before engagement, this clutch is engaged with little delay when the current is maximized to increase the clutch pressure.

The control in case of the power-on shift-down is described above. Next, the control in case that power-off shift-up is determined in step S11 is described hereinafter.

In this case, until a predetermined period of delay time $T_{1U}$ elapses, the present speed range So is also maintained unchanged and the electric current to the linear solenoid 56a is maintained at maximum I(max) in steps S13, S14. Then, after the time $T_{1U}$ has elapsed, it is determined whether or not the input-output speed ratio $e_{CLO}$(=output speed/input speed) in the present range clutch (the pre-shift range clutch) is smaller than a specified speed ratio $e_{SLU}$. In up-shifting, the speed ratio $e_{CLO}$ in the present range clutch is gradually increased from 1.0 after the shift started as the clutch is disengaged. The specified speed ratio $e_{SLU}$ is set to a value greater than 1.0. By determining whether the ratio $e_{CLO}$ is equal to or greater than the ratio $e_{SLU}$ or not, disengagement in the present range clutch, after the shift starts, can be detected.

If $e_{CLO} < e_{SLU}$, in other words, if the present range clutch is not disengaged and the slip in this clutch is zero or quite little, a shift signal $S_1$ to select the first speed range in which no engine brake is available is output and the electric current to the linear solenoid 56a is minimized (Steps S16, S17); thus the selection of the intermediate power transmitting route is determined based on a decision whether the input-output speed ratio "$e_{CLO}$" in the shifting means of the pre-shift power transmitting route (i.e., the off-going clutch) is within a specified range. When the clutch is disengaged and the speed ratio $e_{CLO}$ has become equal to or greater than the specified ratio $e_{SLU}$ ($e_{CLO} >= e_{SLU}$), a shift signal Sa to select a post-shift speed range (a target speed range) based on the shift map is output and the current to the linear solenoid 56a is set to a predetermined low value I(LOWU) (steps S18, S19).

When the speed ratio $e_{CLO}$ becomes substantially 1.0, it is determined that the shift has been completed whereby the method proceeds from the decision step S1 to steps S20 and S21 as shown in FIG. 4, because the response to "Shifting?" is "No". Then the control flow proceeds to the steps S20 and S21, where the target speed range signal Sa is changed to a present speed range signal So and the electric current to the linear solenoid 56a is maximized.

As a preferred embodiment, a control in case of a power-on shift-down is minutely described referring FIG. 5.

In FIG. 5, changes of control values with time are shown in case of a power-on shift-down from the 4th speed range to the 2nd speed range. In this case, the accelerator pedal is depressed at a rapid rate at time $t_1$. Based on the change of the traveling state on the shift map at time $t_1$, a shift signal from 4th to 3rd range is output and a shift signal from 3rd to 2nd follows immediately after the output of the shift signal from 4th to 3rd. However, until the delay time $T_1$ has elapsed after the output of the first shift signal (the shift signal from 4th to 3rd), any shift signal is not transmitted to the shift solenoids. The shift signals are ignored until the time $T_1$ elapses. At time $t_2$ when the delay time $T_1$ elapses, a shift signal to the 1st speed range in which no engine brake is available is transmitted to the shift solenoids and the electric current to the linear solenoid 56a is changed from maximum to minimum.

In correspondence with operations of the shift solenoids, the clutch pressure in the 4th range clutch is rapidly decreased. The input-output speed ratio in this clutch (in the present range clutch) $e_{CLO}$ starts to be decreased (to slip) after a time delay. When the speed ratio $e_{CLO}$ has become smaller than the specified ratio $e_{SLD}$ (at time $t_3$), a shift signal to shift from the 1st speed range to the 2nd speed range (to the target speed range) is transmitted to the shift solenoids. At the same time the electric current to the linear solenoid 56a is changed to the value I(LOWD) corresponding to the clutch pressure by which the piston of the 2nd range clutch can be moved to a position immediately before engagement.

When the shift signal is changed to that for the 2nd speed range, the 2nd range clutch pressure is maintained at a plateau as shown by the 2nd range accumulator 82. The plateau pressure corresponds to the current I(-LOWD), and therefore the 2nd range clutch is brought into a condition immediately before engagement. The engine speed is increased with the depression of the accelerator pedal and the input-output speed ratio $e_{CLa}$ in the 2nd range clutch (the target speed range clutch) rapidly drops from a value $e_1$. The speed ration $e_{CLa}$ becomes 1.0 at time $t_6$ and it is determined that the shift has been completed.

At the same time the electric current to the linear solenoid is maximized at time $t_6$ to rapidly increase the 2nd range clutch pressure to a specified pressure. Accordingly, the 2nd range clutch is engaged immediately to make a shock-free and smooth shift. From this time on, since the 2nd speed range is regarded as a present speed range, the input-output speed ratio $e_{CLO}$ of the present range clutch is set to 1.0.

In the above control, the 4th range clutch pressure rapidly drops and the 4th range clutch is disengaged at time $t_2$. The 2nd range clutch pressure, or the target range clutch pressure, is maintained to be zero as long as the 1st range at which no engine brake is available is set. The 2nd range clutch pressure is raised from the time $t_3$ at which the shift signal is changed from the 1st range to the 2nd range. Therefore, the rise of the 2nd range clutch pressure is delayed. The plateau pressure created by the 2nd range accumulator 82 can be utilized longer.

Also the simultaneous engagement of the 4th and the 2nd range clutches can be prevented.

In the above embodiment, the engine power is retarded during shifting to make the shift smoother. The retard of the engine power can be achieved either through fuel injection cut-off or ignition timing. A slight retard of the engine power starts at time $t_3$ when slip in the 4th range clutch is detected. The amount of retard is increased at the time $t_4$ in accordance with the decrease in the input-output speed ratio $e_{CLa}$ of the 2nd range clutch. Then the retard is gradually diminished from the time $t_5$. An overshoot of deceleration, which is usually brought about when the 2nd range clutch is completely engaged, can be restrained obtaining a smooth shift feeling.

The invention being thus described, it will be obvious that the same may be varied in many ways. Such variations are not to be regarded as a departure from the spirit and scope of the invention, and all such modification as would be obvious to one skilled in the art are intended to be included within the scope of the following claims.

What is claimed is:

1. A method of controlling speed range shifting in an automatic transmission, said transmission having a plurality of power transmitting means by which a plurality of power transmitting routes are constituted and a plurality of shifting means by each of which a power transmitting route defined by one of said power transmitting means is respectively selected, said shifting means being selectively operated in accordance with a shift signal to effectuate shifting, said power transmitting routes includes at least one route in which engine brake is available and at least one route in which no engine brake is available, said method comprising the steps of;

releasing a pre-shift power transmitting route when the shift signal is issued;

selecting an intermediate power transmitting route in which no engine brake is available after the issuance of the shift signal and maintaining said intermediate power transmitting route for as long as an input-output speed ratio in the shifting means for said pre-shift power transmitting route is within a specified range, and then selecting a post-shift power transmitting route based on said shift signal when said input-output speed ratio exceeds said specified range.

2. A method of controlling speed range shifting as defined in claim 1, wherein said shifting means comprises clutch means.

3. A method of controlling speed range shifting as defined in claim 2, wherein, in case of a power-on shift-down, said intermediate power transmitting route is being selected as long as an input-output speed ratio $e_{CLO}$ in the pre-shift range clutch is greater than a specified speed ratio $e_{SLD}$ after the transmission of the power-on shift-down signal, and then the post-shift range clutch in accordance with the shift signal is operated to effectuate said shift when said speed ratio $e_{CLO}$ is equal to or decreases in value below the specified ratio $e_{SLD}$.

4. A method of controlling speed range shifting as defined in claim 3, wherein said post-shift range clutch is brought into a condition immediately before engagement when said speed ratio $e_{CLO}$ has become equal to or less than said specified ratio $e_{SLD}$, and then said post-shift range clutch is brought into engagement when said speed ratio $e_{CLa}$ has become substantially equal to 1.0.

5. A method of controlling speed range shifting as defined in claim 2, wherein, in case of a power-off shift-up, said intermediate power transmitting route is being selected as long as the input-output speed ratio $e_{CLO}$ in the pre-shift range clutch is smaller than a specified speed ratio $e_{SLU}$ after the transmission of the power-off shift-up signal, and then the post-shift range clutch in accordance with the shift signal is operated to effectuate said shift when said speed ratio $e_{CLO}$ becomes equal to or greater than the specified ratio $e_{SLU}$.

6. A method of controlling speed range shifting as defined in claim 5, wherein said post-shift range clutch is brought into a condition immediately before engagement when said speed ratio $e_{CLO}$ has become equal to or greater than said specified ratio $e_{SLU}$, and then said post-shift range clutch is brought into engagement when said speed ratio $e_{CLa}$ has become substantially equal to 1.0.

7. A method of controlling speed range shifting in an automatic transmission, said transmission having a plurality of power transmitting means by which a plurality of power transmitting routes are constituted and a plurality of shifting means by each of which a power transmitting route defined by one of said power transmitting means is respectively selected, said shifting means being selectively operated in accordance with a shift signal to effectuate shifting, said power transmitting routes includes at least one route in which engine brake is available and at least one route in which no engine brake is available and which incorporates a one-way clutch, said method comprising the steps of;

releasing a pre-shift power transmitting route when the shift signal is issued;

selecting an intermediate power transmitting route in which no engine brake is available and which incorporates a one-way clutch after the issuance of the shift signal and maintaining said intermediate power transmitting route for as long as an input-output speed ratio in the shifting means for said pre-shift power transmitting route is within a specified range, and then selecting a post-shift power transmitting route based on said shift signal when said input-output speed ratio exceeds said specified range.

8. A method of controlling speed range shifting as defined in claim 7, wherein said shifting means comprises clutch means.

* * * * *